(12) United States Patent
Mikura et al.

(10) Patent No.: US 10,590,259 B2
(45) Date of Patent: Mar. 17, 2020

(54) GOLF BALL

(71) Applicant: DUNLOP SPORTS CO. LTD., Kobe-shi (JP)

(72) Inventors: Chiemi Mikura, Kobe (JP); Kazuyoshi Shiga, Kobe (JP); Hikaru Nagakura, Kobe (JP); Ryota Sakamine, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 0 days.

(21) Appl. No.: 15/716,972

(22) Filed: Sep. 27, 2017

(65) Prior Publication Data

US 2018/0118918 A1 May 3, 2018

(30) Foreign Application Priority Data

Oct. 31, 2016 (JP) ................. 2016-213480

(51) Int. Cl.

| | | |
|---|---|---|
| A63B 37/02 | (2006.01) | |
| C08K 5/098 | (2006.01) | |
| A63B 37/00 | (2006.01) | |
| C08K 3/22 | (2006.01) | |
| C08K 5/14 | (2006.01) | |
| C08K 5/375 | (2006.01) | |
| C08K 3/30 | (2006.01) | |
| C08K 5/40 | (2006.01) | |

(52) U.S. Cl.

CPC .......... *C08K 5/098* (2013.01); *A63B 37/0033* (2013.01); *A63B 37/0051* (2013.01); *A63B 37/0054* (2013.01); *A63B 37/0061* (2013.01); *A63B 37/0062* (2013.01); *A63B 37/0064* (2013.01); *A63B 37/0065* (2013.01); *A63B 37/0074* (2013.01); *A63B 37/0083* (2013.01); *C08K 3/22* (2013.01); *C08K 5/14* (2013.01); *C08K 5/375* (2013.01); *C08K 3/30* (2013.01); *C08K 5/40* (2013.01); *C08K 2003/2296* (2013.01); *C08K 2003/3045* (2013.01)

(58) Field of Classification Search

None

See application file for complete search history.

(56) References Cited

U.S. PATENT DOCUMENTS

| | | | | |
|---|---|---|---|---|
| 6,762,247 B2 * | 7/2004 | Voorheis | ............ | A63B 37/0003 473/354 |
| 2002/0119834 A1 * | 8/2002 | Bissonnette | ....... | A63B 37/0003 473/371 |
| 2013/0225329 A1 * | 8/2013 | Tomita | ............... | A63B 37/0003 473/374 |
| 2013/0289186 A1 * | 10/2013 | Tomita | ................... | C08K 5/098 524/399 |
| 2018/0001153 A1 * | 1/2018 | Nagakura | .......... | A63B 37/0051 |
| 2018/0169479 A1 * | 6/2018 | Inoue | ................. | A63B 37/0075 |

FOREIGN PATENT DOCUMENTS

| | | |
|---|---|---|
| JP | 2008-212681 A | 9/2008 |
| JP | 2013-027487 A | 2/2013 |
| JP | 2013-027488 A | 2/2013 |

OTHER PUBLICATIONS

Mobofu, Castor Oil as a Potential Renewable Resource for the Production of Functional Materials, Sustainable Chemical Processes (2016) 4:11 pp. 1-12. (Year: 2016).*

* cited by examiner

*Primary Examiner* — David J Buttner

(74) *Attorney, Agent, or Firm* — Oblon, McClelland, Maier & Neustadt, L.L.P.

(57) ABSTRACT

A golf ball includes a spherical core, and a cover covering the spherical core. The spherical core is formed from a rubber composition including a base rubber, a co-cross-linking agent, a cross-linking initiator, and an unsaturated fatty acid and/or a metal salt thereof, the co-cross-linking agent includes α,β-unsaturated carboxylic acid having 3 to 8 carbon atoms and/or a metal salt thereof, the unsaturated fatty acid and/or metal salt thereof excludes an α,β-unsaturated carboxylic acid having 3 to 8 carbon atoms and a metal salt thereof, an unsaturated aliphatic carboxylic acid that forms the unsaturated fatty acid and/or metal salt thereof has a functional group other than a carboxy group and a carbon-carbon unsaturated bond, and the rubber composition further includes a metal compound when the co-cross-linking agent is only an α,β-unsaturated carboxylic acid having 3 to 8 carbon atoms.

19 Claims, 1 Drawing Sheet

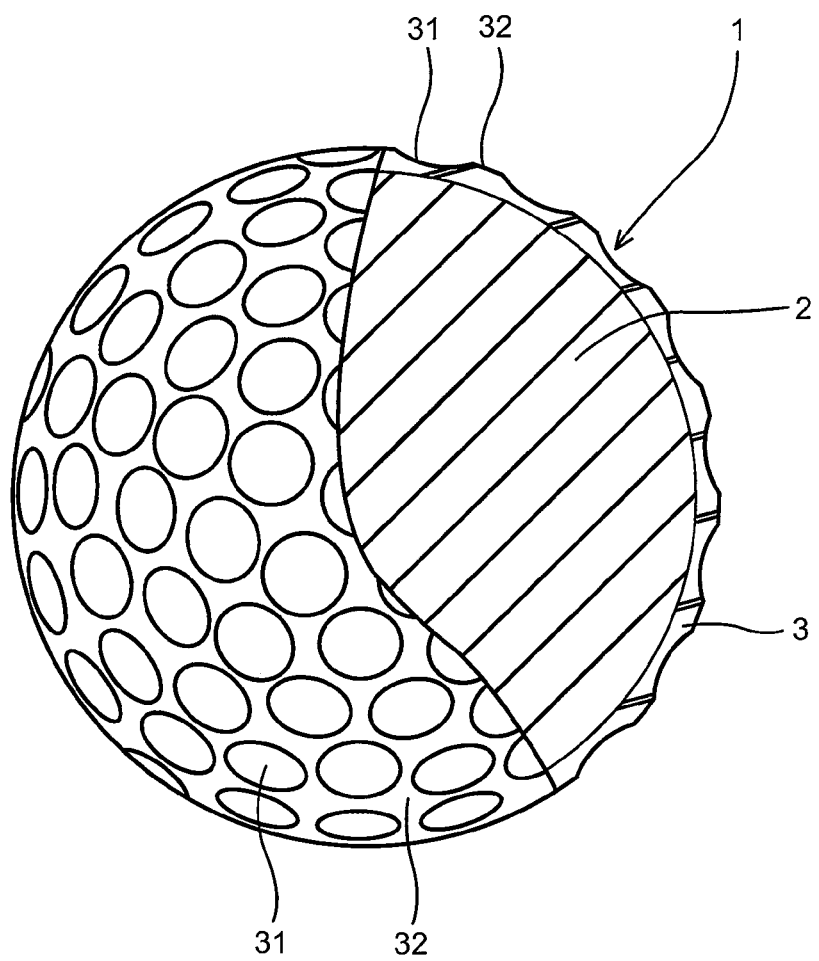

GOLF BALL

CROSS-REFERENCE TO RELATED APPLICATIONS

The present application is based upon and claims the benefit of priority to Japanese Patent Application No. 2016-213480, filed Oct. 31, 2016, the entire contents of which are incorporated herein by reference.

BACKGROUND OF THE INVENTION

Field of the Invention

The present invention relates to a golf ball excellent in flight distance on a driver shot, more specifically, relates to an improvement of a core of a golf ball.

Description of Background Art

Japanese Patent Laid-Open Publication No. 2008-212681 describes a golf ball that includes a cross-linked molded product of a rubber composition as a structural element. Japanese Patent Laid-Open Publication No. 2013-27487 and Japanese Patent Laid-Open Publication No. 2013-27488 describe a golf ball that includes a spherical core and at least one cover covering the spherical core. The spherical core is formed from a rubber composition. The entire contents of these publications are incorporated herein by reference.

SUMMARY OF THE INVENTION

According to one aspect of the present invention, a golf ball includes a spherical core, and a cover covering the spherical core. The spherical core is formed from a rubber composition including a base rubber, a co-cross-linking agent, a cross-linking initiator, and an unsaturated fatty acid and/or a metal salt thereof, the co-cross-linking agent includes α,β-unsaturated carboxylic acid having 3 to 8 carbon atoms and/or a metal salt thereof, the unsaturated fatty acid and/or metal salt thereof excludes an α,β-unsaturated carboxylic acid having 3 to 8 carbon atoms and a metal salt thereof, an unsaturated aliphatic carboxylic acid that forms the unsaturated fatty acid and/or metal salt thereof has a functional group other than a carboxy group and a carbon-carbon unsaturated bond, and the rubber composition further includes a metal compound when the co-cross-linking agent is only an α,β-unsaturated carboxylic acid having 3 to 8 carbon atoms.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGURE is a partially cutaway cross-sectional view illustrating a golf ball according to an embodiment of the present invention.

DETAILED DESCRIPTION OF THE EMBODIMENTS

Embodiments will now be described with reference to the accompanying drawings, wherein like reference numerals designate corresponding or identical elements throughout the various drawings.

A golf ball according to an embodiment of the present invention includes a spherical core, and at least one cover covering the spherical core. The spherical core is formed from a rubber composition that contains (a) a base rubber, (b) an α,β-unsaturated carboxylic acid having 3-8 carbon atoms and/or a metal salt thereof as a co-cross-linking agent, (c) a cross-linking initiator, and (d) an unsaturated fatty acid and/or a metal salt thereof (excluding an α,β-unsaturated carboxylic acid having 3-8 carbon atoms and/or a metal salt thereof). An unsaturated aliphatic carboxylic acid that forms the unsaturated fatty acid and/or the metal salt thereof (d) has a functional group other than a carboxy group and a carbon-carbon unsaturated bond. The rubber composition further contains a metal compound (e) when only an α,β-unsaturated carboxylic acid having 3-8 carbon atoms is contained as (b) the co-cross-linking agent.

(a) Base Rubber

As the base rubber (a), a natural rubber and/or a synthetic rubber can be used. For example, a polybutadiene rubber, a natural rubber, a polyisoprene rubber, a styrene polybutadiene rubber, an ethylene-propylene-diene rubber (EPDM) and the like can be used. These rubbers may each be independently used, or two or more of these rubbers may be used in combination. Among these rubbers, particularly preferred is high cis polybutadiene having cis-1,4-bonds, which are advantageous for resilience, in a proportion of 40 mass % or more, preferably 80 mass % or more, and more preferably 90 mass % or more. A content of the high cis polybutadiene in the base rubber (a) is preferably 50 mass % or more, and more preferably 70 mass % or more.

A 1,2-vinyl bond content of the high cis polybutadiene is preferably 2.0 mass % or less, more preferably 1.7 mass % or less, and even more preferably 1.5 mass % or less. When the 1,2-vinyl bond content is excessively high, resilience may decrease.

The high cis polybutadiene is preferably synthesized using a rare earth element-based catalyst. In particular, use of a neodymium-based catalyst employing a neodymium compound, which is a lanthanum series rare earth element compound, is preferable in that a polybutadiene rubber having a high cis-1,4 bond content and a low 1,2-vinyl bond content is obtained with an excellent polymerization activity.

For the high cis polybutadiene, a molecular weight distribution (Mw/Mn) (Mw: weight average molecular weight; Mn: number average molecular weight) is preferably 2.0 or more, more preferably 2.2 or more, even more preferably 2.4 or more, and most preferably 2.6 or more, and is preferably 6.0 or less, more preferably 5.0 or less, even more preferably 4.0 or less, and most preferably 3.4 or less. When the molecular weight distribution (Mw/Mn) of the high cis polybutadiene is excessively low, processability may deteriorate; and when the molecular weight distribution (Mw/Mn) of the high cis polybutadiene is excessively high, resilience may decrease. The molecular weight distribution is measured using gel permeation chromatography ("HLC-8120GPC" manufactured by Tosoh Corporation) using a differential refractometer as a detector under conditions of column: GMHHXL (manufactured by Tosoh Corporation), column temperature: 40° C., and mobile phase: tetrahydrofuran, and is a value calculated as a standard polystyrene-converted value.

For the high cis polybutadiene, a Mooney viscosity $(ML_{1+4} (100° C.))$ is preferably 30 or more, more preferably 32 or more, and even more preferably 35 or more, and is preferably 140 or less, more preferably 120 or less, even more preferably 100 or less, and most preferably 80 or less. The Mooney viscosity $(ML_{1+4} (100° C.))$ in the present invention is a value measured according to JIS K6300 using an L rotor under conditions of preheating time: 1 minute, rotor rotation time: 4 minutes, and temperature: 100° C.

As the base rubber (a), the rubber composition preferably contains at least two high cis polybutadienes each having a Mooney viscosity ($ML_{1+4}$ (100° C.)) different from each other, and more preferably contains two high cis polybutadienes each having a Mooney viscosity ($ML_{1+4}$ (100° C.)) different from each other. When two high cis polybutadienes are contained, it is preferable that a first high cis polybutadiene has a Mooney viscosity ($ML_{1+4}$ (100° C.)) of less than 50 and a second high cis polybutadiene has a Mooney viscosity ($ML_{1+4}$ (100° C.)) of 50 or more.

The Mooney viscosity ($ML_{1+4}$ (100° C.)) of the first high cis polybutadiene is preferably 30 or more, more preferably 32 or more, and even more preferably 35 or more, and is preferably less than 50, more preferably 49 or less, and even more preferably 48 or less. The Mooney viscosity ($ML_{1+4}$ (100° C.)) of the second high cis polybutadiene is preferable 50 or more, more preferable 52 or more, and even preferable 54 more, and is preferable 100 or less, more preferable 90 or less, even more preferable 80 or less, and most preferable 70 or less.

In the base rubber (a), a mass ratio ((first high cis polybutadiene)/(second high cis polybutadiene)) of the first high cis polybutadiene to the second high cis polybutadiene is preferably 0.3 or more, more preferably 0.5 or more, and even more preferably 0.7 or more, and is preferably 3.0 or less, more preferably 2.0 or less, and even more preferably 1.5 or less.

As (a) the base rubber, the rubber composition preferably also contains a polybutadiene rubber and a polyisoprene rubber. The Mooney viscosity ($ML_{1+4}$ (100° C.)) of the polyisoprene rubber is preferably 55 or more, more preferably 60 or more, and even more preferably 65 or more, and is preferably 120 or less, more preferably 110 or less, and even more preferably 100 or less.

In the base rubber (a), a mass ratio ((polybutadiene rubber)/(polyisoprene rubber)) of the polybutadiene rubber to the polyisoprene rubber is preferably 1 or more, more preferably 2 or more, and even more preferably 4 or more, and is preferably 20 or less, more preferably 15 or less, and even more preferably 10 or less.

(b) Co-Cross-Linking Agent

The α,β-unsaturated carboxylic acid having 3-8 carbon atoms and/or the metal salt thereof (b) is blended as a co-cross-linking agent in the rubber composition and has an effect of cross-linking rubber molecules by graft polymerization to a base rubber molecular chain. The number of carbon atoms of the α,β-unsaturated carboxylic acid used as the co-cross-linking agent (b) is preferably 3-8, more preferably 3-6, and even more preferably 3 or 4. These α,β-unsaturated carboxylic acids having 3-8 carbon atoms and/or the metal salts thereof may each be independently used, or two or more of them may be used in combination.

Examples of α,β-unsaturated carboxylic acids having 3-8 carbon atoms include acrylic acid, methacrylic acid, fumaric acid, maleic acid, crotonic acid and the like. When the rubber composition contains only an α,β-unsaturated carboxylic acid having 3-8 carbon atoms as the co-cross-linking agent, the rubber composition further contains a metal compound (e) as an essential component. This is because neutralizing the α,β-unsaturated carboxylic acid having 3-8 carbon atoms with the metal compound in the rubber composition provides substantially the same effect as using the metal salt of the α,β-unsaturated carboxylic acid having 3-8 carbon atoms as the co-crosslinking agent.

Examples of a metal that forms a metal salt of an α,β-unsaturated carboxylic acid having 3-8 carbon atoms include monovalent metal ions such as sodium, potassium, and lithium; divalent metal ions such as magnesium, calcium, zinc, barium, and cadmium; trivalent metal ions such as aluminum; and other metal ions such as tin, and zirconium. These metal components can each be independently used or two or more of these metal components can be used in combination. Among them, as the metal component, the divalent metals such as magnesium, calcium, zinc, barium, and cadmium are preferred. This is because, by using a divalent metal salt of an α,β-unsaturated carboxylic acid having 3-8 carbon atoms, metal cross-linking between rubber molecules is likely to occur. In particular, as a divalent metal salt, for a reason that resilience of a resultant golf ball is increased, a zinc salt of an α,β-unsaturated carboxylic acid having 3-8 carbon atoms is preferred, and zinc acrylate is more preferred. When an α,β-unsaturated carboxylic acid having 3-8 carbon atoms and a metal salt thereof are used in combination as a co-cross-linking agent, a metal compound (e) may be used as an optional component.

A content of the 4-unsaturated carboxylic acid having 3-8 carbon atoms and/or the metal salt thereof (b), with respect to 100 parts by mass of the base rubber (a), is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less. When the content of the α,β-unsaturated carboxylic acid having 3-8 carbon atoms and/or the metal salt thereof (b) is less than 15 parts by mass, in order for a member formed from the rubber composition to have an appropriate hardness, an amount of the cross-linking initiator (c) (to be described later) is increased and the resilience of the golf ball tends to decrease. On the other hand, when the content of the α,β-unsaturated carboxylic acid having 3-8 carbon atoms and/or the metal salt thereof exceeds 50 parts by mass, there is a risk that a member formed from the rubber composition may become excessively hard and shot feeling of the golf ball may deteriorate.

As the α,β-unsaturated carboxylic acid having 3-8 carbon atoms and/or the metal salt thereof (b), those having a surface covered by a saturated fatty acid and/or a metal salt thereof may also be used. In this case, when a neutralization degree (to be described later) is calculated, a cation component and an anion component of the saturated fatty acid and/or the metal salt thereof used in a surface treatment are respectively included in a cation component and an anion component of the component (b).

(c) Cross-Linking Initiator

The cross-linking initiator (c) is blended in order crosslink the base rubber component (a). As the cross-linking initiator (c), an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy) hexane, di-t-butylperoxide and the like. These organic peroxides may each be independently used, or two or more of these organic peroxides may be used in combination. Among them, dicumyl peroxide is preferably used.

A content of the cross-linking initiator (c), with respect to 100 parts by mass of the base rubber (a), is preferably 0.2 parts by mass or more, more preferably 0.5 parts by mass or more, and even more preferably 0.7 parts by mass or more, and is preferably 5.0 parts by mass or less, more preferably 2.5 parts by mass or less, even more preferably 2.0 parts by mass or less, and particularly preferably 0.9 parts by mass or less. When the content of the cross-linking initiator (c) is less than 0.2 parts by mass, a member formed from the rubber composition tends to become excessively soft and the resilience of the golf ball tends to decrease. When the content of the cross-linking initiator (c) exceeds 5.0 parts by mass, in order for a member formed from the rubber composition to have an appropriate hardness, the amount of the co-cross-linking agent (b) described above is decreased, and there is a risk that the resilience of the golf ball may be insufficient or durability of the golf ball may deteriorate.

(d) Unsaturated Fatty Acid and/or Metal Salt Thereof (d) The unsaturated fatty acid and/or the metal salt thereof is an aliphatic monocarboxylic acid having at least one unsaturated bond (preferably, a carbon-carbon double bond) in a hydrocarbon chain and/or a metal salt thereof. An unsaturated aliphatic carboxylic acid that forms the unsaturated fatty acid and/or the metal salt thereof (d) has a functional group other than a carboxy group and a carbon-carbon unsaturated bond. The unsaturated fatty acid and/or the metal salt thereof (d) does not contain the α,β-unsaturated carboxylic acid having 3-8 carbon atoms and/or the metal salt thereof (b), which is used as the co-cross-linking agent.

Examples of the functional group of the unsaturated aliphatic carboxylic acid that forms the unsaturated fatty acid and/or the metal salt thereof (d) include a hydroxy group (—OH), a halogen group, an ether group (—O—), a dialkylamino group (—NRR'), and the like. A hydroxy group is preferable. The unsaturated aliphatic carboxylic acid may have at least one of these functional groups, or two or more of these functional groups. The unsaturated aliphatic carboxylic acid may have one kind or multiple kinds of functional groups other a carboxy group and a carbon-carbon unsaturated bond.

The number of carbon atoms of the unsaturated fatty acid and/or the metal salt thereof (d) is preferably 4 or more, more preferably 5 or more, even more preferably 8 or more, and particularly preferably 12 or more, and is preferably 33 or less, more preferably 30 or less, even more preferably 27 or less, and particularly preferably 26 or less. When the component (d) is an unsaturated fatty acid having 33 or less carbon atoms and/or a metal salt thereof, an addition reaction between the component (d) and the component (b) more easily occurs, and the resulting spherical core becomes highly resilient.

The number of carbon-carbon double bonds per unit mass of the unsaturated fatty acid and/or the metal salt thereof (d) is preferably 1.00 mmol/g or more, more preferably 1.50 mmol/g or more, and even more preferably 2.00 mmol/g or more, and is preferably 10.00 mmol/g or less, more preferably 9.00 mmol/g or less, and even more preferably 8.00 mmol/g or less. When the number of carbon-carbon double bonds per unit mass of the component (d) is 1.00 mmol/g or more, the addition reaction between the component (d) and the component (b) more easily occurs, and the resulting spherical core becomes highly resilient. When the number of carbon-carbon double bonds per unit mass of the component (d) is 10.00 mmol/g or less, the resulting spherical core becomes highly resilient.

The number of carbon-carbon double bonds of the unsaturated fatty acid and/or the metal salt thereof (d) is preferably 1 or more, and is preferably 4 or less, more preferably 2 or less, and even more preferably 1. When the component (d) is an unsaturated fatty acid having 4 or less carbon-carbon double bonds and/or a metal salt thereof, the addition reaction between the component (d) and the component (b) more easily occurs, and the resulting spherical core becomes highly resilient.

When the unsaturated fatty acid and/or the metal salt thereof (d) is an unsaturated fatty acid having 5 or more carbon atoms and/or a metal salt thereof, the unsaturated fatty acid and/or the metal salt thereof (d) preferably has a first carbon-carbon double bond at a second or later carbon atom, more preferably at a third or later carbon atom, and even more preferably at a fourth or later carbon atom, counted from a carboxyl group side thereof. When the component (d) is an unsaturated fatty acid having a first carbon-carbon double bond at a carbon atom in the above-described range, and/or a metal salt thereof, the addition reaction between the component (d) and the component (b) more easily occurs, and the resulting spherical core becomes highly resilient.

The unsaturated fatty acid and/or the metal salt thereof (d) is preferably an unsaturated fatty acid represented by a chemical formula (1) and/or a metal salt thereof:

Chemical Formula 1

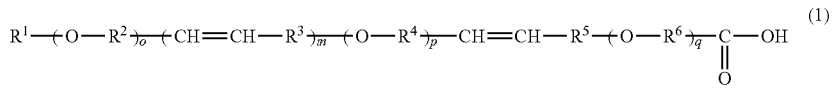

(1)

In the chemical formula (1), $R^1$ represents a hydrogen atom or an alkyl group that has 1-30 carbon atoms and may have a substituent group; $R^3$ represents an alkylene group that has 1-28 carbon atoms and may have a substituent group; $R^5$ represents a single bond or an alkylene group that has 1-30 carbon atoms and may have a substituent group; $R^2$, $R^4$ and $R^6$ each represent a single bond or an alkylene group that has 1-30 carbon atoms and may have a substituent group; m represents a natural number of 0-5; o, p and q each represent a natural number of 0-10; when m, o, p or q is 2 or larger, multiple $R^2$, $R^3$, $R^4$, or $R^6$ may be identical to or different from each other; at least one of $R^1$-$R^6$ has a functional group other than a carboxy group as a substituent group; when m, o, p and q are 0, $R^1$ and/or $R^5$ have a functional group other than a carboxy group as a substituent group; when m is 1 or larger and o, p and q are 0, at least one of $R^1$, $R^3$ and $R^5$ has a functional group other than a carboxy group as a substituent group; and a compound represented by the chemical formula (1) has 4-33 carbon atoms.

In the chemical formula (1), examples of functional groups that $R^1$-$R^6$ can each have as substituent groups include a hydroxy group, a halogen group, and a dialkyl amine group. Examples of the halogen group include a fluoro group, a chloro group, a bromo group, and an iodo group. An example of the dialkylamino group is —$NR^7R^8$ where $R^7$ is an alkyl group having 1-20 carbon atoms, and $R^8$ is an alkyl group having 1-20 carbon atoms.

The alkyl group having 1-30 carbon atoms represented by $R^1$ may have a branched structure or a cyclic structure. However, a linear alkyl group is preferable. The number of carbon atoms of the alkyl group is preferably 1 or more, more preferably 3 or more, and even more preferably 5 or more, and is preferably 25 or less, more preferably 23 or less, and even more preferably 21 or less.

The alkylene group having 1-28 carbon atoms represented by $R^3$ may have a branched structure or a cyclic structure. However, a linear alkylene group is preferable. The number of carbon atoms of the alkylene group is preferably 1 or more, more preferably 3 or more, and even more preferably 5 or more, and is preferably 25 or less, more preferably 23 or less, and even more preferably 21 or less.

The alkylene group having 1-30 carbon atoms represented by $R^5$ may have a branched structure or a cyclic structure. However, a linear alkylene group is preferable. The number of carbon atoms of the alkylene group is preferably 2 or more, more preferably 3 or more, and even more preferably 4 or more, and is preferably 25 or less, more preferably 23 or less, and even more preferably 21 or less.

m is preferably 3 or less, more preferably 2 or less, even more preferably 1 or less, and particularly preferably 0. o, p and q are each preferably 10 or less, more preferably 8 or less, even more preferably 6 or less, and particularly preferably 0. A sum of o, p and q is preferably 3 or less, more preferably 2 or less, even more preferably 1 or less, and particularly preferably 0.

In a compound represented by the chemical foiinula (1), $R^1$ is preferably an alkyl group that has a functional group as a substituent group, and $R^2$-$R^6$ are each preferably an alkylene group that does not have a substituent group. Further, the functional group of $R^1$ is preferably a hydroxy group.

As a compound represented by the chemical formula (1), a compound represented by the following chemical formula (2) or chemical formula (3) is more preferable.

Chemical Formula 2

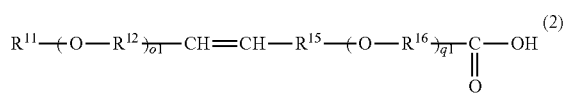

In the chemical formula (2), $R^{11}$ represents a hydrogen atom or an alkyl group that has 1-30 carbon atoms and may have a substituent group; $R^{15}$ represents a single bond or an alkylene group that has 1-30 carbon atoms and may have a substituent group; $R^{12}$ and $R^{16}$ each represent a single bond or an alkylene group that has 1-30 carbon atoms and may have a substituent group; o1 and q1 each represent a natural number of 0-10; when o1 or q1 is 2 or larger, multiple $R^{12}$ or $R^{16}$ may be identical to or different from each other; at least one of $R^{11}$, $R^{12}$, $R^{15}$ and $R^{16}$ has a functional group other than a carboxy group as a substituent group; when o1 and q1 are 0, at least one of $R^{11}$ and $R^{15}$ has, as a substituent group, a functional group other than a carboxy group; and a compound represented by the chemical formula (2) has 4-33 carbon atoms.

In the chemical formula (2), examples of functional groups that $R^{11}$, $R^{12}$, $R^{15}$ and $R^{16}$ can each have as substituent groups include a hydroxy group, a halogen group, and a dialkylamino group. Examples of the halogen group include a fluoro group, a chloro group, a bromo group, and an iodo group. An example of the dialkylamino group is —$NR^7R^8$ where $R^7$ is an alkyl group having 1-20 carbon atoms, and $R^8$ is an alkyl group having 1-20 carbon atoms.

The alkyl group having 1-30 carbon atoms represented by $R^{11}$ may have a branched structure or a cyclic structure. However, a linear alkyl group is preferable. The alkylene group having 1-30 carbon atoms represented by $R^{15}$ may have a branched structure or a cyclic structure. However, a linear alkylene group is preferable. o1 and q1 are each preferably 10 or less, more preferably 8 or less, even more preferably 6 or less, and particularly preferably 0. A sum of o1 and q1 is preferably 3 or less, more preferably 2 or less, even more preferably 1 or less, and particularly preferably 0.

In the chemical formula (2), when $R^{11}$ is an alkyl group, and $R^{15}$ is an alkylene group, a ratio ($R^{11}$/$R^{15}$) of the number of carbon atoms of $R^{11}$ to the number of carbon atoms of $R^{15}$ is preferably 0.1 or more, more preferably 0.5 or more, and even more preferably 0.8 or more, and is preferably 10.0 or less, more preferably 5.0 or less, and even more preferably 1.3 or less. When the ratio ($R^{11}$/$R^{15}$) of the numbers of carbon atoms is within the above range, the addition reaction between the component (d) and the component (b) efficiently occurs, and the resulting spherical core becomes highly resilient.

In a compound represented by the chemical formula (2), RH is preferably an alkyl group that has a functional group as a substituent group, and $R^{15}$ preferably an alkylene group that does not have a substituent group. Further, the functional group of $R^{11}$ is preferably a hydroxy group.

Chemical Formula 3

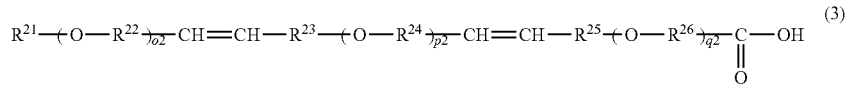

Iin the chemical formula (3), $R^{21}$ represents a hydrogen atom or an alkyl group that has 1-27 carbon atoms and may have a substituent group; $R^{23}$ represents an alkylene group that has 1-28 carbon atoms and may have a substituent group; $R^{25}$ represents a single bond or an alkylene group that has 1-27 carbon atoms and may have a substituent group; $R^{22}$, $R^{24}$ and $R^{26}$ each represent a single bond or an alkylene group that has 1-27 carbon atoms and may have a substituent group; o2, p2 and q2 each represent a natural number of 0-10; when o2, p2, or q2 is 2 or larger, multiple $R^{22}$, $R^{24}$, or $R^{26}$ may be identical to or different from each other; at least one of $R^{21}$-$R^{26}$ has a functional group other than a carboxy group as a substituent group; when o2, p2 and q2 are 0, at least one of $R^{21}$, $R^{23}$ and $R^{25}$ has, as a substituent group, a functional group other than a carboxy group; and a compound represented by the chemical formula (3) has 4-33 carbon atoms.

In the chemical formula (3), examples of functional groups that $R^{21}$-$R^{26}$ can each have as substituent groups include a hydroxy group, a halogen group, and a dialkylamino group. Examples of the halogen group include a fluoro group, a chloro group, a bromo group, and an iodo group. An example of the dialkylamino group is —NR$^7$R$^8$ where R$^7$ is an alkyl group having 1-20 carbon atoms, and R$^8$ is an alkyl group having 1-20 carbon atoms.

The alkyl group having 1-27 carbon atoms represented by R$^{21}$ may have a branched structure or a cyclic structure. However, a linear alkyl group is preferable. The alkylene group having 1-28 carbon atoms represented by R$^{23}$ may have a branched structure or a cyclic structure. However, a linear alkylene group is preferable. The alkylene group having 1-27 carbon atoms represented by R$^{25}$ may have a branched structure or a cyclic structure. However, a linear alkylene group is preferable.

The number of carbon atoms of the alkylene group represented by R$^{23}$ is preferably 25 or less, more preferably 20 or less, and even more preferably 15 or less. As the alkylene group represented by R$^{23}$, a methylene group and an ethylene group are preferable, and a methylene group is more preferable. o2, p2 and q2 are each preferably 10 or less, more preferably 8 or less, even more preferably 6 or less, and particularly preferably 0. A sum of o2, p2 and q2 is preferably 3 or less, more preferably 2 or less, even more preferably 1 or less, and particularly preferably 0.

In the chemical formula (3), when R$^{21}$ is an alkyl group, and R$^{25}$ is an alkylene group, a ratio (R$^{21}$/R$^{25}$) of the number of carbon atoms of R$^{21}$ to the number of carbon atoms of R$^{25}$ is preferably 0.1 or more, more preferably 0.5 or more, and even more preferably 0.8 or more, and is preferably 10.0 or less, more preferably 5.0 or less, and even more preferably 1.3 or less. When the ratio (R$^{21}$/R$^{25}$) of the numbers of carbon atoms is within the above range, the addition reaction between the component (d) and the component (b) efficiently occurs, and the resulting spherical core becomes highly resilient.

In a compound represented by the chemical formula (3), R$^{21}$ is preferably an alkyl group that has a functional group as a substituent group, and R$^{23}$ and R$^{25}$ are each preferably an alkylene group that does not have a substituent group. Further, the functional group of R$^{21}$ is preferably a hydroxy group.

The unsaturated fatty acid and/or the metal salt thereof (d) is preferably a linear unsaturated fatty acid and/or a metal salt thereof. Examples of the unsaturated fatty acid and/or the metal salt thereof (d) include an unsaturated fatty acid having a carbon-carbon double bond at a terminal of a hydrocarbon chain and/or a metal salt thereof, an unsaturated fatty acid having at least one trans-isomerized carbon-carbon double bond and/or a metal salt thereof, and an unsaturated fatty acid having at least one cis-isomerized carbon-carbon double bond and/or a metal salt thereof. The unsaturated fatty acid and/or the metal salt thereof (d) is preferably an unsaturated fatty acid having at least one cis-isomerized carbon-carbon double bond and/or a metal salt thereof.

Specific examples of the unsaturated aliphatic carboxylic acid that forms the unsaturated fatty acid and/or the metal salt thereof (d) include unsaturated fatty acids each having a hydroxy group, such as a ricinoleic acid (C18, cis-9-monounsaturated fatty acid) and a ricinelaidic acid (C18, trans-9-monounsaturated fatty acid); and the like.

Examples of the metal that forms the unsaturated fatty acid and/or the metal salt thereof (d) include monovalent metal ions such as sodium, potassium, and lithium; divalent metal ions such as magnesium, calcium, zinc, barium, and cadmium; trivalent metal ions such as aluminum; and other ions such as tin, and zirconium. These metal components can each be independently used or two or more of these metal components can be used in combination. Among them, as the metal component, the divalent metals such as magnesium, calcium, zinc, barium, and cadmium are preferred, and zinc is particularly preferred. These unsaturated fatty acids and/or metal salts thereof (d) may each be independently used, or two or more of them may be used in combination.

A content of the unsaturated fatty acid and/or the metal salt thereof (d), with respect to 100 parts by mass of the base rubber (a), is preferably 1 part by mass or more, more preferably 2 parts by mass or more, and even more preferably 3 parts by mass or more, and is preferably 35 parts by mass or less, more preferably 30 parts by mass or less, even more preferably 25 parts by mass or less, particularly preferably 20 parts by mass or less, and most preferably 17 parts by mass or less. When the content of the component (d) is 1 part by mass or more, the effect of adding the component (d) is sufficiently achieved, and the resulting spherical core becomes highly resilient. When the content of the component (d) is 35 parts by mass or less, the spherical core does not become excessively soft, and durability and high resilience of the golf ball are not impaired.

In addition to the unsaturated fatty acid and/or the metal salt thereof (d), the rubber composition may contain an unsaturated fatty acid that does not have a functional group other than a carboxy group and/or a metal salt thereof. Specific examples of an unsaturated fatty acid that forms the unsaturated fatty acid that does not have a functional group other than a carboxy group and/or a metal salt thereof include: unsaturated fatty acids each having a double bond at a terminal thereof such as 4-pentenoic acid (C5, monounsaturated fatty acid, (4)), 5-hexenoic acid (C6, monounsaturated fatty acid, (5)), 6-heptenoic acid (C7, monounsaturated fatty acid, (6)), 7-octenoic acid (C8, monounsaturated fatty acid, (7)), 8-nonenoic acid (C9, monounsaturated fatty acid, (8)), 9-decenoic acid (C10, monounsaturated fatty acid, (9)), and 10-undecylenic acid (C11, monounsaturated fatty acid, (10)); unsaturated fatty acids each having a double bond at a site other than a terminal thereof such as myristoleic acid (C14, cis-9-monounsaturated fatty acid, (9)), palmitoleic acid (C16, cis-9-monounsaturated fatty acid, (9)), stearidonic acid (C18, 6, 9, 12, 15-tetra unsaturated fatty acid, (6)), vaccenic acid (C18, cis-11-monounsaturated fatty acid, (11)), oleic acid (C18, cis-9-monounsaturated fatty acid, (9)), elaidic acid (C18, trans-9-monounsaturated fatty acid, (9)), linoleic acid (C18, cis-9-cis-12-diunsaturated fatty acid, (9)), α-linolenic acid (C18, 9, 12, 15-triunsaturated fatty acid, (9)), γ-linolenic acid (C18, 6, 9, 12-triunsaturated fatty acid, (6)), gadoleic acid (C20, cis-9-monounsaturated fatty acid, (9)), eicosenoic acid (C20, cis-11-monounsaturated fatty acid, (11)), eicosadienoic acid (C20, cis-11-cis-14-diunsaturated fatty acid, (11)), arachidonic acid (C20, 5, 8, 11, 14-tetraunsaturated fatty acid, (5)), eicosapentaenoic acid (C20, 5, 8, 11, 14, 17-penta unsaturated fatty acid, (5)), erucic acid (C22, cis-13-monounsaturated fatty acid, (13)), docosahexaenoic acid (C22, 4, 7, 10, 13, 16, 19-hexa unsaturated fatty acid, (4)), and nervonic acid (C24, cis-15-monounsaturated fatty acid, (15)); and the like. A number in the parentheses after a compound name, such as (10), indicates a position of a carbon atom, counted from the carboxyl group side of the unsaturated fatty acid, at which a first carbon-carbon double bond is positioned.

In the case where the unsaturated fatty acid that does not have a functional group other than a carboxy group and/or a metal salt thereof is contained, a total content of the unsaturated fatty acid and/or the metal salt thereof (d) and the unsaturated fatty acid that does not have a functional group other than a carboxy group and/or a metal salt thereof, with respect to 100 parts by mass of the base rubber(a), is preferably 1 part by mass or more, more preferably 2 parts by mass or more, and even more preferably 3 parts by mass or more, and is preferably 35 parts by mass or less, more preferably 30 parts by mass or less, even more preferably 25 parts by mass or less, particularly preferably 20 parts by mass or less, and most preferably 17 parts by mass or less. When the total content is 1 part by mass or more, the effect of adding the component (d) is sufficiently achieved, and the resulting spherical core becomes highly resilient. When the total content is 35 parts by mass or less, the spherical core does not become excessively soft, and the durability and the high resilience of the golf ball are not impaired.

(e) Metal Compound

When a rubber composition in an embodiment of the present invention contains only an α,β-unsaturated carboxylic acid having 3-8 carbon atoms as the co-cross-linking agent, the rubber composition further contains a metal compound (e) as an essential component. The metal compound (e) is not particularly limited as long as the metal compound can neutralize the α,β-unsaturated carboxylic acid having 3-8 carbon atoms (b) in the rubber composition. Examples of the metal compound (e) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. The metal compound (e) is preferably a divalent metal compound, and more preferably a zinc compound. This is because the divalent metal compound reacts with the α,β-unsaturated carboxylic acid having 3-8 carbon atoms, thereby forming metal cross-links Further, by using a zinc compound, a highly resilient golf ball is obtained. The metal compounds (e) may each be independently used, or two or more of the metal compounds may be used in combination. A content of the metal compound (e) can be appropriately adjusted according to a desired neutralization degree of the α,β-unsaturated carboxylic acid having 3-8 carbon atoms (b) and the unsaturated aliphatic carboxylic acid (d).

A neutralization degree of the rubber composition (alkali equivalents of metal ions when acid equivalents of carboxy groups and carboxylate groups in the rubber composition is 100 mol %) is preferably 100 mol % or more, more preferably 105 mol % or more, even more preferably 108 mol % or more, and particularly preferably 110 mol % or more, and is preferably 300 mol % or less, more preferably 270 mol % or less, even more preferably 250 mol % or less, and particularly preferably 200 mol % or less. When the neutralization degree is 100 mol % or more, the durability of the golf ball can be maintained without changing a compression deformation amount of the core. On the other hand, when the neutralization degree is 300 mol % or less, the resulting spherical core does not become excessively soft, and the high resilience of the golf ball is not impaired. The neutralization degree of the rubber composition is defined by the following mathematical formula.

Mathematical Formula 1

$$\text{Neutralization degree (mol \%)} = \left\{ \frac{\sum \begin{pmatrix} \text{number of moles of} \\ \text{cation component} \times \\ \text{valence of cation component} \end{pmatrix}}{\sum \begin{pmatrix} \text{number of moles of} \\ \text{anion component} \times \\ \text{valence of anion component} \end{pmatrix}} \right\} \times 100$$

In the mathematical formula (1), Σ((number of moles of cation component)×(valence of cation component)) is a sum of a product of a number of moles of metal ions and a valence of the metal ions of the component (b), a product of a number of moles of metal ions and a valence of the metal ions of the component (d), and a product of a number of moles of metal ions and a valence of the metal ions of the component (e); Σ((number of moles of anion component)× (valence of anion component)) is a sum of a total number of moles of carboxy groups and carboxylate groups of the component (b), and a total number of moles of carboxy groups and carboxylate groups of the component (d).

(f) Organic Sulfur Compound

A rubber composition in an embodiment of the present invention preferably further contains an organic sulfur compound (f). When the rubber composition contains the organic sulfur compound (f), the resilience of the spherical core is improved.

The organic sulfur compound (f) is not particularly limited as long as the organic sulfur compound is an organic compound that has a sulfur atom in a molecule. Examples of the organic sulfur compound (f) include an organic compound having a thiol group (—SH) or a polysulfide bond having 2-4 sulfur atoms (—S—S—, —S—S—S— or —S—S—S—S—), and metal salts thereof (—SM, —S-M-S—, —S-M-S—S—, —SS-M-S—S—, —S-M-S—S—S—, or the like, where M is a metal atom). Examples of the metal salts include salts of monovalent metals such as sodium, lithium, potassium, copper (I), and silver (I); and salts of divalent metals such as zinc, magnesium, calcium, strontium, barium, titanium (II), manganese (II), iron (II), cobalt (II), nickel (II), zirconium (II), and tin (II). Further, the organic sulfur compound (f) may be any one of an aliphatic compos nd (such as aliphatic thiol, aliphatic thiocarboxylic acid, aliphatic dithiocarboxylic acid, or aliphatic polysulfide), a heterocyclic compound, an alicyclic compound (such as alicyclic thiol, alicyclic thiocarboxylic acid, alicyclic dithiocarboxylic acid, or alicyclic polysulfide), and an aromatic compound.

Examples of the organic sulfur compound (f) include thiols (thiophenols and thionaphthols), polysulfides, thiurams, thiocarboxylic acids, dithiocarboxylic acids, sulfenamides, dithiocarbamates, thiazoles, and the like.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. As the metal salt, a zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Preferable examples of the thionaphthols (naphthalenethiols) include 2-thionaphthol, 1-thionaphthol, and metal salts thereof. The metal salt is preferably a divalent metal salt, and more preferably a zinc salt. Specific examples of the metal salt include a zinc salt of 1-thionaphthol and a zinc salt of 2-thionaphthol.

The polysulfides are organic sulfur compounds having a polysulfide bond. Examples of the polysulfides are organic sulfur compounds include disulfides, trisulfides, and tetrasulfides. As the polysulfides, diphenylpolysulfides are preferable.

Examples of the diphenylpolysulfides include, in addition to diphenyldisulfide, diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; and the like.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

Preferable examples of the organic sulfur compound (f) include thiophenols and/or metal salt thereof, thionaphthols and/or metal salt thereof, diphenyldisulfides, and thiuramdisulfides. More preferable examples of the organic sulfur compound (f) include 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide.

These organic sulfur compounds (f) can each be independently used, or two or more of these organic sulfur compounds (f) can be used in combination.

A content of the organic sulfur compound (f), with respect to 100 parts by mass of the base rubber (a), is preferably 0.05 parts by mass or more, more preferably 0.1 parts by mass or more, and even more preferably 0.2 parts by mass or more, and is preferably 5.0 parts by mass or less, more preferably 3.0 parts by mass or less, and even more preferably 2.0 parts by mass or less. When the content of the organic sulfur compound (f) is less than 0.05 parts by mass, there is a risk that the effect of adding the organic sulfur compound (f) is not achieved, and the resilience of the golf ball is not improved. Further, when the content of the organic sulfur compound (f) exceeds 5.0 parts by mass, there is a risk that a compression deformation amount of the resulting golf ball may increase and the resilience of the golf ball may decrease.

Rubber Composition

A ratio (component (d)/component ((b)) of a total number of moles of carbon-carbon double bonds of the unsaturated fatty acid and/or the metal salt thereof (d) to a total number of moles of carbon-carbon double bonds of the α,β-unsaturated carboxylic acid having 3-8 carbon atoms and/or the metal salt thereof (b) is preferably 0.01 or more, more preferably 0.03 or more, and even preferably 0.06 or more, and is preferably 0.20 or less, more preferably 0.18 or less, and even more preferably 0.16 or less. When the ratio (component (d)/component (b)) is 0.01 or more, the addition reaction between the component (d) and the component (b) more easily occurs, and the resulting spherical core becomes highly resilient. On the other hand, when the ratio (component (d)/component (b)) is 0.20 or less, the durability of the golf ball can be maintained without changing a compression deformation amount of the spherical core.

A rubber composition in an embodiment of the present invention may further contain additives such as a pigment, a filler for adjusting a weight or the like, an anti-aging agent, a peptizing agent, and a softening agent, when necessary. Further, the rubber composition for the core may also contain rubber powder obtained by pulverizing cores of golf balls and edge materials generated during production of cores.

Examples of the pigment blended into the rubber composition can include a white pigment, a blue pigment, a purple pigment and the like. As the white pigment, titanium oxide is preferably used. A type of the titanium oxide is not particularly limited, but a rutile type is preferably used because of high opacity. A content of the titanium oxide (f), with respect to 100 parts by mass of the base rubber (a), is preferably 0.5 parts by mass or more, and more preferably 2 parts by mass or more, and is preferably 8 parts by mass or less, and more preferably 5 parts by mass or less.

It is also preferable that the rubber composition contain both a white pigment and a blue pigment. The blue pigment is blended in order to make a white color vivid. Examples of blue pigments include ultramarine blue, cobalt blue, phthalocyanine blue, and the like. Further, examples of the purple pigment include anthraquinone violet, dioxazine violet, methyl violet, and the like.

The filler blended in the rubber composition is mainly used as a weight adjusting agent for adjusting a weight of ahe golf ball obtained as a final product. The filler may be blended when necessary. Examples of the filler include an inorganic filler such as zinc oxide, barium sulfate, calcium carbonate, magnesium oxide, tungsten powder, molybdenum powder, and the like. Zinc oxide is particularly preferably used as the filler. It is believed that the zinc oxide functions as a vulcanization agent and increases the hardness of the entire spherical core. A content of the filler, with respect to 100 parts by mass of the base rubber, is preferably 0.5 parts by mass or more, and more preferably 1 part by mass or more, and is preferably 30 parts by mass or less, more preferably 25 parts 10 by mass or less, and even more preferably 20 parts by mass or less. This is because that, when the content of the filler is less than 0.5 parts by mass, weight adjustment becomes difficult, and when the content of the filler exceeds 30 parts by mass, a weight ratio of the rubber component is reduced and the resilience tends to decrease.

A content of the anti-aging agent, with respect to 100 parts by mass of the base rubber (a), is preferably 0.1 part by mass or more and 1 part by mass or less. Further, a content of the peptizing agent, with respect to 100 parts by mass of the base rubber (a), is preferably 0.1 part by mass or more and 5 parts by mass or less.

A rubber composition in an embodiment of the present invention is obtained by mixing and kneading the base rubber (a), the a,13-unsaturated carboxylic acid having 3-8 carbon atoms and/or the metal salt thereof (b), the cross-linking initiator (c), the unsaturated fatty acid and/or the metal salt thereof (d), and, when necessary, other additives and the like. A kneading method is not particularly limited. For example, a kneading machine, such as a kneading roll, a Banbury mixer or a kneader, can be used.

The spherical core can be obtained by molding the kneaded rubber composition in a mold. A temperature at which the spherical core is molded is preferably 120° C. or more, and more preferably 150° C., and is preferably 170° C. or less. Further, a pressure during the molding is preferably 2.9-11.8 MPa. A molding time is preferably 10-60 minutes.

Spherical Core

A diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. When the diameter of the spherical core is 34.8 mm or more, a thickness of the cover does not become excessively large and the resilience is further improved. On the other hand, when the diameter of the spherical core is 42.2 mm or less, the thickness of the cover does not become excessively small and the function of the cover is further enhanced.

When the diameter of the spherical core is in a range of 34.8 mm-42.2 mm, a compression deformation amount of the spherical core (an amount by which a center shrinks along a compression direction) when a load is applied and is increased from an initial load of 98 N to a final load of 1275 N is preferably 1.90 mm or more, more preferably 2.00 mm or more, and even more preferably 2.10 mm or more, and is preferably 5.00 mm or less, more preferably 4.80 mm or less, and even more preferably 4.60 mm or less. When the compression deformation amount is 1.90 mm or more, the shot feeling of the golf ball is further improved. When the compression deformation amount is 5.00 mm or less, the resilience of the golf ball is further improved.

A hardness difference (Hs−Ho) between a surface hardness (Hs) and a center hardness (Ho) of the spherical core, in Shore C hardness, is preferably 10 or more, more preferably 15 or more, and even more preferably 20 or more, and is preferably 90 or less, more preferably 80 or less, and even more preferably 70 or less. When the hardness difference is large, a golf ball having a high launch angle, a low spin and a long flight distance is obtained.

The center hardness (Ho) of the spherical core, in Shore C hardness, is preferably 10 or more, more preferably 15 or more, and even more preferably 20 or more. When the center hardness (Ho) of the spherical core is 10 or more in Shore C hardness, the spherical core does not become excessively soft, and a satisfactory resilience is obtained. Further, the center hardness (Ho) of the spherical core, in Shore C hardness, is preferably 90 or less, more preferably 80 or less, and even more preferably 70 or less. When the center hardness (Ho) is 90 or less in Shore C hardness, the spherical core does not become excessively hard, and a satisfactory shot feeling of the golf ball is obtained.

The surface hardness (Hs)of the spherical core, in Shore C hardness, is preferably 30 or more, more preferably 40 or more, and even more preferably 50 or more, and is preferably 100 or less, more preferably 90 or less, and even more preferably 80 or less. When the surface hardness of the spherical core is 30 or more in Shore C hardness, the spherical core does not become excessively soft, and a satisfactory resilience is obtained. When the surface hardness of the spherical core is 100 or less in Shore C hardness, the spherical core does not become excessively hard, and a satisfactory shot feeling of the golf ball is obtained.

Cover

A cover of a golf ball according to an embodiment of the present invention is formed from a cover composition containing a resin component. Examples of the resin component include an ionomer resin; a thermoplastic polyurethane elastomer commercially available under a trade name of "Elastollan (registered trademark)" from BASF Japan Ltd.; a thermoplastic polyamide elastomer commercially available under a trade name of "Pebax (registered trademark)" from Arkema Corporation; a thermoplastic polyester elastomer commercially available under a trade name of "Hytrel (registered trademark)" from Du Pont-Toray Co., Ltd.; and a thermoplastic styrene elastomer commercially available under a trade name of "Rabalon (registered trademark)" from Mitsubishi Chemical Corporation; and the like.

Examples of the ionomer resin include a product obtained by neutralizing at least a part of carboxyl groups in a binary copolymer composed of an olefin and an α,β-unsaturated carboxylic acid having 3-8 carbon atoms with metal ions; a product obtained by neutralizing at least a part of carboxyl groups in a ternary copolymer composed of an olefin, an α,β-unsaturated carboxylic acid having 3-8 carbon atoms and an α,β-unsaturated carboxylic acid ester with metal ions; and a mixture of those. As the olefin, an olefin having 2-8 carbon atoms is preferable. Examples of the olefin include ethylene, propylene, butene, pentene, hexene, heptene, octene, and the like. The ethylene is particularly preferable. Examples of the α,β-unsaturated carboxylic acid having 3-8 carbon atoms include acrylic acid, methacrylic acid, fumaric acid, maleic acid, crotonic acid, and the like. Among these, acrylic acid and methacrylic acid are particularly preferred. Further, as the α,β-unsaturated carboxylic acid ester, for example, methyl ester, ethyl ester, propyl ester, n-butyl ester, isobutyl ester of acrylic acid, methacrylic acid, fumaric acid, maleic acid or the like are used. In particular, acrylic acid ester and methacrylic acid ester are preferred. Among these, as the ionomer resin, a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester are preferable.

Specific examples of the ionomer resin include, in trade names, "Himilan (registered trademark) (for example, Himilan 1555 (Na), 1557 (Zn), 1605 (Na), 1706 (Zn), 1707 (Na), AM3711 (Mg), and the like; and ternary copolymerized ionomer resins such as Himilan 1856 (Na), andl 855 (Zn))" available from Du Pont-Mitsui Polychemicals Co., Ltd.

Further, examples of ionomer resins commercially available from DuPont include "Surlyn (registered trademark) (for example, Surlyn 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li), and the like; and ternary copolymerized ionomer resins such as Surlyn 8120 (Na), 8320 (Na), 9320 (Zn), 6320 (Mg), HPF 1000 (Mg), and HPF 2000 (Mg))".

Further, examples of ionomer resins commercially available from Exxon Mobil Chemical Corporation include "Iotek (registered trademark) (for example, Iotek 8000 (Na), 8030 (Na), 7010 (Zn), 7030 (Zn), and the like; and ternary copolymerized ionomer resins such as Iotek 7510 (Zn), and 7520 (Zn))".

Na, Zn, Li, Mg and the like described in the parentheses after the trade names of the ionomer resins respectively indicate metal types of the metal ions for neutralizing the ionomer resins. These ionomer resins may each be independently used, or two or more of these ionomer resins may be used in combination.

The cover composition that forms the cover of a golf ball according to an embodiment of the present invention preferably contains, as a resin component, a thermoplastic polyurethane elastomer or an ionomer resin. When the ionomer resin s used, it is also preferable to use a thermoplastic styrene elastomer in combination. A content rate of the polyurethane or ionomer resin in the resin component of the cover composition is preferably 50 mass % or more, more preferably 60 mass % or more, and even more preferably 70 mass % or more.

In addition to the above-described resin component, the cover composition may further contain a pigment component such as a white pigment (such as titanium oxide), a blue pigment and a red pigment; a weight adjusting agent such as zinc oxide, calcium carbonate and barium sulfate; a dispersant; an anti-aging agent; an ultraviolet absorber; a light stabilizer; a fluorescent material or a fluorescent brightener; and the like, as long as they do not impair the performance of the cover.

A content of the white pigment (for example, titanium oxide), with respect to 100 parts by mass of the resin component that forms the cover, is preferably 0.5 part by mass or more, and more preferably 1 part by mass or more, and is preferably 10 parts by mass or less, and more preferably 8 parts by mass or less. When the content of the white pigment is 0.5 parts by mass or more, it is possible to impart opacity to the cover. Further, when the content of the white pigment exceeds 10 parts by mass, durability of the resulting cover may deteriorate.

It is preferable to appropriately set slab hardness of the cover composition in accordance with desired performance of the golf ball. For example, for a distance-type golf ball that emphasizes a flight distance, a slab hardness of the cover composition in Shore D hardness is preferably 50 or more, more preferably 55 or more, and even more preferably 60 or more, and is preferably 80 or less, more preferably 70 or less, and even more preferably 68 or less. When the slab hardness of the cover composition is 50 or more, a golf ball having a high launch angle and a low spin on a driver shot and on an iron shot is obtained, and the flight distance is improved. Further, when the slab hardness of the cover composition is 80 or less, a golf ball excellent in durability is obtained. Further, for a spin-type golf ball that emphasizes controllability, the slab hardness of the cover composition in Shore D hardness is preferably less than 50, and is preferably 20 or more, more preferably 25 or more, and even more preferably 30 or more. When the slab hardness of the cover composition is less than 50 in Shore D hardness, a high flight distance on a driver shot can be achieved by a core according to an embodiment of the present invention, and a golf ball that has an increased amount of spin on an approach shot and easily stops on the green is obtained. Further, when the slab hardness of the cover composition is 20 or more, abrasion resistance is improved. When multiple cover layers are provided, slab hardness of cover compositions that respectively for the cover layers may be identical to or different from each other as long as the slab hardness of the layers are within the above range.

Examples of a method for molding the cover of a golf ball according to an embodiment of the present invention include a method in which hollow shells are molded from the cover composition and the core is covered with multiple hollow shells and the resulting object is subjected to compression molding (preferably, a method in which hollow half shells are molded from the cover composition and the code is covered with two half shells and the resulting object is subjected to compression molding), and a method in which the cover composition is directly injection-molded onto the core.

When the cover is molded using a compression molding method, molding of half shells may be performed using either a compression molding method or an injection molding method. However, the compression molding method is preferable. Conditions for compression molding the cover composition into half shells can include, for example, a pressure of 1 MPa or more and 20 MPa or less and a molding temperature of −20° C. or more and 70° C. or less relative to a flow beginning temperature of the cover composition. By performing the molding under the above conditions, half shells having a uniform thickness can be molded. An example of a method for molding the cover using half shells is a method in which the core is covered with two half shells and the resulting object is subjected to compression molding. Conditions for molding the cover by compression molding half shells can include, for example, a molding pressure of 0.5 MPa or more and 25 MPa or less and a molding temperature of −20° C. or more and 70° C. or less relative to a flow beginning temperature of the cover composition. By performing the molding under the above conditions, a golf ball cover having a unifoiiu thickness can be molded.

When the cover composition is injection molded into the cover, it is possible that the cover composition extruded in a pellet form beforehand is used for the injection molding, or the cover materials such as the base resin component and the pigments are dry blended and the blended material is directly injection molded. As upper and lower molds for cover molding, it is preferable to use molds having hemispherical cavities and pimples, in which some of the pimples also serve as retractable hold pins. When the cover is molded by injection molding, the hold pins are protruded, the core is put in and is held by the hold pins, and thereafter, the cover composition is charged and then cooled, and thereby, the cover is molded. For example, the molding of the cover may be performed as follows: the cover composition heated to a temperature in a range of 200° C.-250° C. is charged in 0.5-5 seconds into a mold held under a pressure in a range of 9 MPa-15 MPa, and then is cooled for 10 seconds-60 seconds, and then the mold is opened.

When the cover is molded, concave portions called "dimples" are usually formed on a surface of the cover. A total number of dimples formed on the cover is preferably 200 or more and 500 or less. When the total number of dimples is less than 200, a dimple effect is unlikely to be obtained. On the other hand, when the total number of dimples exceeds 500, a size of each of the dimples becomes smaller and the dimple effect is unlikely to be obtained. A shape (shape in a plan view) of each of the formed dimples is not particularly limited. Examples of shapes of the dimples include a circle; a polygonal shape such as a substantially triangular shape, a substantially quadrangular shape, a substantially pentagonal shape, and a substantially hexagonal shape; and other irregular shape. These shapes of the dimples may each be independently used, or two or more of these shapes may be used in combination.

The thickness of the cover is preferably 4.0 mm or less, more preferably 3.0 mm or less, and even more preferably 2.0 mm or less. When the thickness of the cover is 4.0 mm or less, the resilience and shot feeling of the resulting golf ball are further improved. The thickness of the cover is preferably 0.3 mm or more, more preferably 0.5 mm or more, even more preferably 0.8 mm or more, and particularly preferably 1.0 mm or more. When the thickness of the cover is less than 0.3 mm, the durability and wear resistance of the cover may deteriorate. When multiple cover layers are provided, a total thickness of the multiple cover layers is preferable within the above range.

A golf ball body having the cover molded thereon is ejected from the mold and, when necessary, is preferably subjected to surface treatments such as deburring, cleaning and sandblast. Further, when desired, a coating film or a mark can be formed. A thickness of the coating film is not particularly limited, but is preferably 5 μm or more, and more preferably 7 μm or more, and is preferably 50 μm or less, more preferably 40 μm or less, and even more preferably 30 μm or less. When the thickness of the coating film is less than 5 μm, the coating film is likely to wear off due to continued use of the golf ball. When the thickness of the coating film exceeds 50 μm, the dimple effect is decreased and the flight performance of the golf ball is decreased.

Golf Ball

A structure of a golf ball according to an embodiment of present invention is not particularly limited as long as the structure has a spherical core and a cover of one or more cover layers covering the spherical core. The spherical core preferably has a single-layer structure. Unlike a multi-layer structure, the spherical core of the single-layer structure does not have energy loss at an interface of the multi-layer structure when being hit, and the resilience of the spherical core is improved. Further, the cover has a structure of one or more layers, and may have a single-layer structure or a multi-layer structure of two or more layers. Examples of the golf ball according to an embodiment of the present invention include a two-piece golf ball that includes a spherical core and a single-layer cover arranged so as to cover the spherical core; a multi-piece golf ball (including a three-piece golf ball) that includes a spherical core and a cover of two or more cover layers arranged so as to cover the spherical core; and a thread-wound golf ball that includes a spherical core, a thread rubber layer provided around the spherical core, and a cover arranged so as to over the thread rubber layer. The present invention can be suitably applied to golf balls having any one of the above structures.

A golf ball according to an embodiment of the present invention preferably has a diameter ranging from 40 mm to 45 mm. From a point of view of satisfying standards of the US Golf Association (USGA), the diameter is particularly preferably 42.67 mm or more. From a point of view of air resistance suppression, the diameter is more preferably 44 mm or less, and particularly preferably 42.80 mm or less. Further, a golf ball according to an embodiment of the present invention preferably has a mass of 40 g or more and 50 g or less. From a point of view that a large inertia can be obtained, the mass is more preferably 44 g or more, and particularly preferably 45.00 g or more. From a point of view of satisfying standards of the USGA, the mass is particularly preferably 45.93 g or less.

When a golf ball according to an embodiment of the present invention has a diameter in a range of 40 mm-45 mm, the compression deformation amount of the golf ball (shrinking amount of the golf ball along the compression direction) when a load is applied and is increased from an initial load of 98 N to a final load of 1275 N is preferably 2.0 mm or more, more preferably 2.2 mm or more, and even more preferably 2.4 mm or more, and is preferably 4.0 mm or less, more preferably 3.5 mm or less, and even more preferably 3.4 mm or less. When the compression deformation amount is 2.0 mm or more, the golf ball does not become excessively hard and a satisfactory shot feeling of the golf ball is obtained. On the other hand, when the compression deformation amount is 4.0 mm or less, the resilience of the golf ball is increased.

Figure is a partially cutaway cross-sectional view illustrating a golf ball according to an embodiment of the present invention. A golf ball 1 has a spherical core 2 and cover 3 covering the spherical core 2. A large number of dimples 31 are formed on a surface of the cover. Other portion than the dimples 31 of the surface of the cover 3 is a land 32. The golf ball 1 has a paint layer and a mark layer on an outer side of the cover 3. However, illustration of the paint layer and the mark layer is omitted.

EXAMPLES

In the following, an embodiment of the present invention is described in detail by way of examples. However, the present invention is not limited to the examples described below. Various changes and modifications without departing from the spirit of the present invention are included in the scope of the present invention.

Evaluation Methods (1) Compression Deformation Amount

A deformation amount in a compression direction (a shrinking amount of the core or golf ball along the compression direction) when a load is applied to the core or golf ball and is increased from an initial load of 98 N to a final load of 1275 N was measured.

(2) Coefficient of Restitution

A metal cylindrical object having a mass of 198.4 g was caused to collide with each core or golf ball at a speed of 40 m/sec. The speeds of the cylindrical object and the core or golf ball before and after the collision were measured. Based on the speeds and the masses of these objects, a coefficient of restitution of each core or golf ball was calculated. Twelve measurements were conducted for each core or golf ball, and an average value thereof was adopted as the coefficient of restitution for the each core or golf ball. The coefficient of restitution is expressed as a difference from the coefficient of restitution of a golf ball No. 1.

material was heated and pressed in upper and lower molds, each having a hemispherical cavity, at 150° C. for 20 minutes, and thereby, a spherical core having a diameter of 39.8 mm was obtained. Barium sulfate was added in an appropriate amount such that the resulting golf ball had a mass of 45.4 g.

TABLE 1

| | | | 1 | 2 | 3 | 4 | 5 |
|---|---|---|---|---|---|---|---|
| Rubber composition | Formulation (parts by mass) | (a) BR730 | 100 | 100 | 100 | 100 | 100 |
| | | (b) ZN-DA90S | 27 | 28 | 28 | 28 | 28 |
| | | (c) Dicumyl peroxide | 0.8 | 0.8 | 0.8 | 0.8 | 0.8 |
| | | (d) Zinc ricinoleate (C18: 1, 9) | — | 5.8 | 11.7 | — | — |
| | | Zinc stearate | — | — | — | 5.6 | 11.2 |
| | | (e) Zinc oxide | 5 | 5 | 5 | 5 | 5 |
| | | (f) PBDS | 0.63 | 0.63 | 0.63 | 0.63 | 0.63 |
| | | Barium sulfate | Appropriate amount | Appropriate amount | Appropriate amount | Appropriate amount | Appropriate amount |
| | | Number of carbon-carbon double bonds of (d) component (mmol/g) | — | 3.03 | 3.03 | — | — |
| | | Ratio ((d)/(b)) of total numbers of carbon-carbon double bonds | — | 0.04 | 0.07 | — | — |
| | | Neutralization degree (mol %) | 151 | 146 | 143 | 146 | 143 |
| Spherical core | | Compression deformation amount (mm) | 3.8 | 3.8 | 3.8 | 3.8 | 3.8 |
| | | Coefficient of restitution | Reference | 0.004 | 0.006 | 0.002 | 0.002 |
| | | Center hardness (Ho) (Shore C) | 53.8 | 52.1 | 48.0 | 50.8 | 48.6 |
| | | Surface hardness (Hs) (Shore C) | 80.0 | 76.1 | 72.0 | 81.0 | 82.0 |
| | | Hardness difference (Hs − Ho) (Shore C) | 26.3 | 24.1 | 24.0 | 30.3 | 33.5 |
| Cover | | Slab hardness (Shore D) | 65 | 65 | 65 | 65 | 65 |
| | | Thickness (mm) | 1.5 | 1.5 | 1.5 | 1.5 | 1.5 |
| Golf ball | | Compression deformation amount (mm) | 3.3 | 3.3 | 3.3 | 3.3 | 3.3 |
| | | Coefficient of restitution | Reference | 0.004 | 0.006 | 0.002 | 0.002 |
| | | Flight distance on driver shot (yd) | Reference | 1.5 | 2.0 | 0.2 | 0.3 |

(3) Core Hardness (Shore C Hardness)

A hardness measured at a surface of a core was adopted as a core surface hardness. Further, the core was cut into hemispheres, and a hardness was measured at a center of a cut surface. The hardness was measured using an automatic hardness tester (Digitest II, commercially available from H. Barleys Company). As a detector, "Shore C" was used.

(4) Slab Hardness (Shore D Hardness)

Sheets each having a thickness of about 2 mm were produced by injection molding the cover composition, and were stored at 23° C. for two weeks. Three or more of these sheets were stacked on one another so as not to be affected by a measurement substrate or the like, and a hardness of the stack was measured using an automatic hardness tester (Digitest II, commercially available from H. Barleys Company). As a detector, "Shore D" was used.

(5) Flight Distance on Driver Shot

A W #1 driver provided with a metal head (XXIO S, loft angel: 11 degrees, commercially available from Dunlop Sports Ltd.) was attached to a swing robot M/C commercially available from Golf Laboratories, Inc. A golf ball was hit at a head speed of 40 m/sec, and a flight distance (a distance from a launch point to a stop point) was measured. The measurement was conducted twelve times for each golf ball, and an average value thereof was adopted as a measured value for the each golf ball. The flight distance of each golf ball was expressed as a difference from the flight distance of the golf ball No. 1 (flight distance difference=flight distance of each golf ball−flight distance of golf ball No. 1).

Production of Golf Ball (1) Production of Core

Each of rubber compositions of formulations shown in Table 1 was kneaded using a kneading roll, and the kneaded Materials used in Table 1 are as follows.

BR730: high cis polybutadiene rubber (content of cis-1,4 bond=96 mass %; content of 1,2-vinyl bond=1.3 mass %; Moony viscosity ($ML_{1+4}$ (100° C.)=55; molecular weight distribution (Mw/Mn)=3) commercially available from JSR Corporation ZN-DA9OS: zinc acrylate (containing zinc stearate in an amount of 10 mass %) commercially available from Nisshoku Techno Fine Chemical Co., Ltd.

Dicumyl peroxide: commercially available from Tokyo Chemical Industry Co., Ltd.

Zinc ricinoleate: commercially available from Nitto Kasei Co., Ltd. (purity: 50 mass % (containing 50 mass % of zinc stearate)) (unsaturated fatty acid, C18; in the chemical formula (2), o1 and q1 are 0; R11 has 8 carbon atoms; R15 has 7 carbon atoms; (number of carbon atoms of R11)/(number of carbon atoms of R15)=1.1; R11 has a hydroxyl group as a substituent group)

Zinc stearate: commercially available from Nihon Joryu Kogyo Co., Ltd. (saturated fatty acid metal salt)

Zinc oxide: "Ginrei R" commercially available from Toho Zinc Co., Ltd.

PBDS: bis(pentabromophenyl)disulfide, commercially available from Kawaguchi Chemical Industry Co., Ltd.

Barium sulfate: "Barium sulfate BD" commercially available from Sakai Chemical Industry Co., Ltd.

(2) Production of Cover and Production of Golf Ball

Each of cover materials of formulations shown in Table 2 was extruded with a twin-screw kneading extruder to prepare a cover composition in a pellet form. Extruding conditions of the cover composition were a screw diameter of 45 mm, a screw rotation speed of 200 rpm, and screw L/D=35, and the mixture was heated to a temperature in a range of 160-230° C. at a position of a die of the extruder. The resulting cover composition was injection molded onto the spherical core obtained as described above to produce a golf ball having a spherical core and a cover covering the spherical core.

TABLE 2

| Cover Composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

Materials used in Table 2 are as follows.

Himilan 1605: sodium ion neutralized ethylene-methacrylic acid copolymer-based ionomer resin commercially available from Du Pont-Mitsui Polychemicals Co., Ltd.

Himilan 1706: zinc ion neutralized ethylene-methacrylic acid copolymer-based ionomer resin commercially available from Du Pont-Mitsui Polychemicals Co., Ltd.

Titanium oxide: A220 commercially available from Ishihara Sangyo Kaisha, Ltd.

Evaluation results of the golf balls are shown in Table 1. Golf balls No. 2 and No. 3 each have a spherical core that is formed from a rubber composition that contains (a) a base rubber, (b) a co-cross-linking agent, (c) a cross-linking initiator, (d) an unsaturated fatty acid and/or a metal salt thereof, and (f) a metal compound. These golf balls all have improved resilience and flight distance on a driver shot as compared to the golf ball No. 1.

Golf balls No.4 and No. 5 each do not contain the component (d), but contain zinc stearate. These golf balls have improved resilience and flight distance on a driver shot as compared to the golf ball No.1, but the improvement is small As a method for increasing a flight distance of a golf ball on a driver shot, for example, there are a method of using a highly resilient core and a method of using a core having a hardness distribution in which hardness increases from a center of the core toward a surface of the core. The former has an effect of increasing an initial speed of the golf ball, and the latter has an effect of increasing a launch angle and reducing spin of the golf ball. A golf ball having a higher launch angle and a lower spin has a greater flight distance.

For increasing resilience of a core, there is a method in which an organic sulfur compound is added to a rubber composition, which is a structural element of the core. Further, for increasing resilience of a core, for example, Japanese Patent Laid-Open Publication No. 2008-212681 describes a golf ball that includes a cross-linked molded product of a rubber composition as a structural element, the rubber composition containing a base rubber, a filler, an organic peroxide, an α,β-unsaturated carboxylic acid and/or a metal salt thereof as essential components and further containing a copper salt of a saturated or unsaturated fatty acid.

Further, for increasing a flight distance on a driver shot, Japanese Patent Laid-Open Publication No. 2013-27487 and Japanese Patent Laid-Open Publication No. 2013-27488 describe a golf ball that includes a spherical core and at least one cover covering the spherical core, the spherical core being fanned from a rubber composition that contains (a) a base rubber, (b) an α,β-unsaturated carboxylic acid having 3-8 carbon atoms and/or a metal salt thereof as a co-cross-linking agent, (c) a cross-linking initiator, and (d) a carboxylic acid having 4-30 carbon atoms or a carboxylic acid salt having 4-30 carbon atoms, and further contains (e) a metal compound when only an α,β-unsaturated carboxylic acid having 3-8 carbon atoms is contained as (b) the co-cross-linking agent.

A golf ball according to an embodiment of the present invention provides excellent flight distance on a driver shot.

A golf ball according to an embodiment of the present invention that solves the above problem includes a spherical core, and at least one cover covering the spherical core. The spherical core is formed from a rubber composition that contains (a) a base rubber, (b) an α,β-unsaturated carboxylic acid having 3-8 carbon atoms and/or a metal salt thereof as a co-cross-linking agent, (c) a cross-linking initiator, and (d) an unsaturated fatty acid and/or a metal salt thereof (excluding an α,β-unsaturated carboxylic acid having 3-8 carbon atoms and/or a metal salt thereof). An unsaturated aliphatic carboxylic acid that forms the unsaturated fatty acid and/or the metal salt thereof (d) has a functional group other than a carboxy group and a carbon-carbon unsaturated bond. The rubber composition further contains a metal compound (e) when only an α,β-unsaturated carboxylic acid having 3-8 carbon atoms is contained as (b) the co-cross-linking agent. By blending the unsaturated fatty acid and/or the metal salt thereof (d), having a functional group other than a carboxy group and a carbon-carbon unsaturated bond, in the rubber composition, a flight distance on a driver shot of the obtained golf ball is improved.

According to an embodiment of the present invention, a golf ball excellent in flight distance on a driver shot is obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A golf ball, comprising:
a spherical core; and
a cover covering the spherical core,
wherein the spherical core is formed from a rubber composition comprising a base rubber, a co-cross-linking agent, a cross-linking initiator, and an unsaturated fatty acid and/or a metal salt thereof, the co-cross-linking agent comprises at least one of α,β-unsaturated carboxylic acid having 3 to 8 carbon atoms and a metal salt thereof, the unsaturated fatty acid and/or metal salt thereof excludes an α,β-unsaturated carboxylic acid having 3 to 8 carbon atoms and a metal salt thereof and is formed such that an unsaturated aliphatic carboxylic acid that forms the unsaturated fatty acid and/or metal salt thereof has a hydroxy group, the rubber composition further includes a metal compound when the co-cross-linking agent is consisting of an α,β-unsaturated carboxylic acid having 3 to 8 carbon atoms, and the rubber composition includes the co-cross-linking agent in a range of 25 parts by mass to 35 parts by mass, and the unsaturated fatty acid and/or metal salt thereof in a range of 11.7 part by mass to 35 parts by mass with respect to 100 parts by mass of the base rubber.

2. The golf ball according to claim 1, wherein the unsaturated aliphatic carboxylic acid that forms the unsaturated fatty acid and/or metal salt thereof includes at least one of a ricinoleic acid and a ricinelaidic acid.

3. The golf ball according to claim 1, wherein the unsaturated fatty acid and/or metal salt thereof is an unsaturated fatty acid haying 4 to 33 carbon atoms and/or a metal salt thereof.

4. The golf ball according to claim 1, wherein the unsaturated fatty acid and/or metal salt thereof is an unsaturated fatty acid having one or two carbon-carbon double bonds and/or a metal salt thereof.

5. The golf ball according to claim 1, wherein the unsaturated fatty acid and/or metal salt thereof is an unsaturated fatty acid of formula (1) and/or a metal salt thereof,

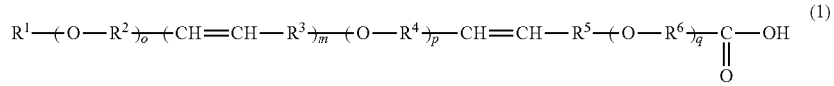

where $R^1$ represents a hydrogen atom or a substituted or unsubstituted alkyl group having 1 to 30 carbon atoms, $R^3$ represents a substituted or unsubstituted alkylene group having 1 to 28 carbon atoms, $R^5$ represents a single bond or a substituted or unsubstituted alkylene group having 1 to 30 carbon atoms, $R^2$, $R^4$ and $R^6$ each represent a single bond or a substituted or unsubstituted alkylene group having 1 to 30 carbon atoms, m represents a natural number of 0 to 5, o, p and q each represent a natural number of 0 to 10, at least one of $R^1$ to $R^6$ has the hydroxyl group as a substituent group when m, o, p or q is 2 or larger, $R^2$, $R^3$, $R^4$ and $R^6$ are identical to or different from each other, at least one of $R^1$ and $R^5$ has the hydroxyl group as a substituent group when m, o, p and q are 0, at least one of $R^1$, $R^3$ and $R^5$ has the hydroxyl group as a substituent group when m is 1 or larger and o, p and q are 0, and a compound of the formula (1) has 4-33 carbon atoms.

6. The golf ball according to claim 1, wherein the unsaturated fatty acid and/or metal salt thereof is a linear unsaturated fatty acid and/or a metal salt thereof.

7. The golf ball according to claim 1, wherein the rubber composition includes the unsaturated fatty acid and/or metal salt thereof in a range of 11.7 parts by mass to 30 parts by mass with respect to 100 parts by mass of the base rubber.

8. The golf ball according to claim 1, wherein the rubber composition includes the co-cross-linking agent comprising the metal salt of the α,β-unsaturated carboxylic acid having 3 to 8 carbon atoms.

9. The golf ball according to claim 1, wherein the rubber composition has a neutralization degree in a range of 100 mol % to 300 mol %.

10. The golf ball according to claim 1, wherein the rubber composition further includes an organic sulfur compound.

11. The golf ball according to claim 10, wherein the organic sulfur compound is at least one compound selected from the group consisting of a thiophenol, a diphenyldisulfide, a thionaphthol, a thiuramdisulfide, and a metal salt thereof.

12. The golf ball according to claim 10, wherein the rubber composition includes the organic sulfur compound in a range of 0.05 parts by mass to 5 parts by mass with respect to 100 parts by mass of the base rubber.

13. The golf ball according to claim 7, wherein the unsaturated fatty acid and/or metal salt thereof is an unsaturated fatty acid having 4 to 33 carbon atoms and/or a metal salt thereof.

14. The golf ball according to claim 3, wherein the unsaturated fatty acid and/or metal salt thereof is an unsaturated fatty acid having one or two carbon-carbon double bonds and/or a metal salt thereof.

15. The golf ball according to claim 3, wherein the unsaturated fatty acid and/or metal salt thereof is an unsaturated fatty acid of formula (1) and/or a metal salt thereof,

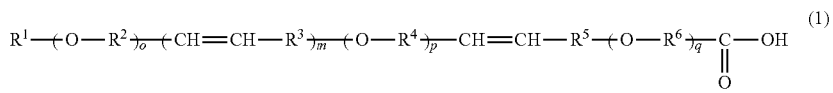

where $R^1$ represents a hydrogen atom or a substituted or unsubstituted alkyl group having 1 to 30 carbon atoms, $R^3$ represents a substituted or unsubstituted alkylene group having 1 to 28 carbon atoms, $R^5$ represents a single bond or a substituted or unsubstituted alkylene group having 1 to 30 carbon atoms, $R^2$, $R^4$ and $R^6$ each represent a single bond or a substituted or unsubstituted alkylene group having 1 to 30 carbon atoms, m represents a natural number of 0 to 5, o, p and q each represent a natural number of 0 to 10, at least one of $R^1$ to $R^6$ has the hydroxyl group as a substituent group when m, o, p or q is 2 or larger, $R^2$, $R^3$, $R^4$ and $R^6$ are identical to or different from each other, at least one of $R^1$ and $R^5$ has the hydroxyl group as a substituent group when m, o, p and q are 0, at least one of $R^1$, $R^3$ and $R^5$ has the hydroxyl group as a substituent group when m is 1 or larger and o, p and q are 0, and a compound of the formula (1) has 4-33 carbon atoms.

16. The golf ball according to claim 3, wherein the unsaturated fatty acid and/or metal salt thereof is a linear unsaturated fatty acid and/or a metal salt thereof.

17. The golf ball according to claim 2, wherein the rubber composition includes the unsaturated fatty acid and/or metal salt thereof in a range of 11.7 parts by mass to 25 parts by mass with respect to 100 parts by mass of the base rubber.

18. The golf ball according to claim 2, wherein the rubber composition includes the co-cross-linking agent comprising the metal salt of the α,β-unsaturated carboxylic acid having 3 to 8 carbon atoms.

19. The golf ball according to claim 2, wherein the rubber composition has a neutralization degree in a range of 100 mol % to 300 mol %.

* * * * *